(12) United States Patent
Fanta et al.

(10) Patent No.: US 7,052,776 B2
(45) Date of Patent: *May 30, 2006

(54) FORMATION OF HYDROPHILIC POLYSACCHARIDE COATINGS ON HYDROPHOBIC SUBSTRATES

(75) Inventors: George F. Fanta, Morton, IL (US); Frederick C. Felker, Morton, IL (US)

(73) Assignee: The United States of Amercia as represented by the Secretary of Agriculture, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/849,977

(22) Filed: May 20, 2004

(65) Prior Publication Data

US 2004/0265606 A1     Dec. 30, 2004

Related U.S. Application Data

(63) Continuation of application No. PCT/US02/37215, filed on Nov. 20, 2002, which is a continuation-in-part of application No. 09/989,365, filed on Nov. 20, 2001, now Pat. No. 6,709,763.

(51) Int. Cl.
    *B32B 33/00*     (2006.01)

(52) U.S. Cl. ............... 428/532; 428/507; 428/480; 428/474.4; 428/374.1

(58) Field of Classification Search ............... 428/532, 428/507, 480, 474.4, 374.1, 479.3, 481
See application file for complete search history.

(56) References Cited

U.S. PATENT DOCUMENTS

| | | | |
|---|---|---|---|
| 3,317,330 A | | 5/1967 | Livingston et al. |
| 3,935,099 A | * | 1/1976 | Weaver et al. ............... 210/689 |
| 4,156,664 A | | 5/1979 | Skinner et al. |
| 4,728,694 A | | 3/1988 | Batich et al. |
| 5,550,177 A | * | 8/1996 | Fanta et al. ................... 524/47 |
| 5,852,078 A | | 12/1998 | Willett et al. |
| 6,040,063 A | | 3/2000 | Doane et al. |
| 6,231,970 B1 | | 5/2001 | Anderson et al. |
| 6,709,763 B1 | * | 3/2004 | Fanta et al. ................... 428/532 |

FOREIGN PATENT DOCUMENTS

| | | |
|---|---|---|
| EP | 1176255 A1 | 1/2002 |
| EP | 0480362 A2 | 4/2002 |
| JP | 61085450 | 5/1986 |
| JP | 04226575 | 4/1991 |
| JP | 06040485 | 2/1994 |
| JP | 06113746 | 4/1994 |

OTHER PUBLICATIONS

Fanta, G. et al., "Formation of Hydrophilic Starch Coatings on Polyethylene Films," Journal of Applied Polymer Science, 84(9), May 31, 2002, pp. 1781-1788.*

Dwight, David, "Practicing polymer surface chemistry-a stream of consciousness", CHEMTECH, Mar. 1982, pp. 166-171.

Dasgupta, Sunil, "Surface Modification of Polyolefins for Hydrophilicity and Bondability: Ozonization and Grafting Hydrophilic Monomers on Ozonized Polyolefins", Journal of Applied Polymer Science, vol. 41, pp. 233-248, 1990.

Terlingen, Johannes G. A. et al., "Introduction of Functional Groups on Polyethylene Surfaces by a Carbon Dioxide Plasma Treatment", Journal of Applied Polymer Science, vol. 57, pp. 969-982, 1995.

Yamada, Kazunori et al., "Hydrophilic and Adhesive Properties of Methacrylic Acid-Grafted Polyethylene Plates", Journal of Applied Polymer Science, vol. 44, pp. 993-1001, 1992.

Rasmussen, James R. et al., "Introduction, Modification, and Characterization of Functional Groups on the Surface of Low-Density Polyethylene Film", Journal of the American Chemical Society, vol. 99, pp. 4736-4745, Jul. 1977.

* cited by examiner

*Primary Examiner*—Melanie Bissett
(74) *Attorney, Agent, or Firm*—John D. Fado; Curtis P. Ribando; Lesley Shaw

(57) ABSTRACT

Articles produced from hydrophobic polymers (e.g., polyethylene) are surface-coated with thin films of starch in order to render the surfaces hydrophilic. The thin coatings form on the surfaces of plastic objects when the objects are placed in contact with hot, aqueous solutions of starch. These starch coatings are adherent to the hydrophobic plastic surfaces under both wet and dry conditions, and they permit the surfaces to be uniformly wet with water. The coatings may be rendered even more adherent when wet by graft polymerizing the starch with a synthetic monomer. Resultant products have the potential for improved biocompatibility, improved compatibility with hydrophilic reagents, reduced build-up of electrostatic charge, reduced blocking, reduced friction, improved absorption of water-based dyes, and improved adhesion properties. The starch coatings are non-toxic, inexpensive and biodegradable.

18 Claims, No Drawings

FORMATION OF HYDROPHILIC POLYSACCHARIDE COATINGS ON HYDROPHOBIC SUBSTRATES

This application is a continuation application of International Application No. PCT/US02/37215 filed Nov. 20, 2002, which claims priority from U.S. application Ser. No. 09/989,365, filed Nov. 20, 2001, now U.S. Pat. No. 6,709,763, both herein incorporated in their entirety by reference. No additional subject matter has been introduced.

BACKGROUND OF THE INVENTION

1. Field of the Invention

This invention relates to compositions comprised of a plastic component and a water-soluble hydroxylic polymer component and to a simple process for preparing these compositions. The hydroxylic polymer constitutes only a minor percentage, by weight, of the total composition and is present as a thin coating on the surface of the plastic. The hydroxylic polymer is typically a polysaccharide such as starch. Although the amount of polysaccharide deposited on the surface of the plastic is often too small to be seen without the aid of a microscope, it is sufficient to allow the hydrophobic plastic surface to be wet with a uniform film of water that does not readily separate from the surface as droplets or beads. Polysaccharide coatings are formed spontaneously, in the absence of any additives, when granular starch is dissolved at high temperature and pressure by steam jet cooking, and the resulting dilute starch solution is placed in contact with the plastic surface and allowed to cool. The polysaccharide coating remains attached to the plastic surface, even after prolonged soaking in water followed by drying.

2. Description of the Prior Art

The properties and chemical composition of starch and the methods used to prepare aqueous dispersions and solutions of starch are described in Eskins et al. (U.S. Pat. Nos. 5,676,994 and 5,882,713, which are herein incorporated by reference). Briefly, starch is a high polymer composed of repeating glucose units and is typically a mixture of linear and branched polymers, i.e., amylose and amylopectin. Cornstarch is the most plentiful and least expensive of all the commercial starch varieties. Although normal food grade cornstarch contains about 25% amylose by weight, commercial varieties of cornstarch are available that contain 0% amylose (waxy cornstarch) and about 50% and 70% amylose by weight (high amylose cornstarch). Normal cornstarch is the least expensive starch variety and is thus the preferred starch for the purposes of this invention. Starch occurs in living plants as granules ranging from about 5 to 40 microns in diameter, depending upon the plant source. These granules are essentially insoluble in water at room temperature; however, a significant amount of starch begins to dissolve and diffuse out of the granule matrix as the temperature reaches about 70° C., which is the approximate gelatinization temperature. Although water-solubility increases with temperature, starch granules do not dissolve completely, even at 100° C.; and a major portion of the starch remains as highly swollen but insoluble granule fragments. True solutions of starch in water, with no remaining insoluble material, are difficult to prepare using conventional batch-cooking techniques; and autoclaves are typically required for batch cooking. However, starch solutions are easily prepared on a continuous basis by passing aqueous dispersions of starch through a steam jet cooker at elevated temperatures and pressures. This process has been used commercially for decades to prepare starch solutions for industrial applications and is discussed in more detail in Eskins et al. (U.S. Pat. Nos. 5,676,994 and 5,882,713, supra) and also in an article by R. E. Klem and D. A. Brogly (Pulp & Paper, 55:98–103, May, 1981). Dissolved molecules of starch (especially amylose) tend to associate with one another through hydrogen bond formation and form gels and precipitates when solutions are cooled. This property is commonly known as retrogradation and is an inherent property of all starch pastes and solutions.

It is well known that practical end-use applications of polymeric materials are often dictated by their surface properties. This fact is particularly true for polymer films, for example, polyethylene. Although polyethylene films exhibit high levels of strength, toughness, flexibility and percent elongation, their hydrophobic surfaces repel water, thus ruling out or severely limiting their use in many applications. Adhesion, dye absorption, friction, electrostatic charging, biocompatibility and compatibility with hydrophilic reagents are all examples of polymer properties that are negatively influenced by poor surface wetting. A number of techniques for improving the surface wetting of hydrophobic polymers have been described, and the subject of surface modification of polymers has been summarized in an article by Dwight (CHEMTECH, March 1982, p. 166). Other articles have also appeared that describe methods used to modify polymer surfaces. For example, Rasmussen et al., (Journal of the American Chemical Society, Vol. 99, 1977, p. 4736) describe oxidation of the surface of polyethylene film with solutions of chromic acid and nitric acid. Foltynowicz (Macromolecules, Vol. 18, 1985, p. 1394) describes polymerization of surfactants on the surface of polyethylene to alter the surface properties. Dasgupta (Journal of Applied Polymer Science, Vol. 41, 1990, p. 233) describes the modification of polyethylene and polypropylene surfaces by treatment with ozone. Nakayama & Matsuda (Journal of Polymer Science: Part A: Polymer Chemistry, Vol. 31, 1993, p. 3299) describe the fixation of poly (ethylene glycol) on the surface of hydrophobic polymers by chemical reaction. Terlingen et al. (Journal of Applied Polymer Science, Vol. 57, 1995, p. 969) describe the introduction of functional groups onto polyethylene surfaces by a carbon dioxide plasma treatment. Graft polymerization of hydrophilic monomers onto the surfaces of hydrophobic polymers is also a frequently used technique for modifying surface properties. Representative examples of this technique may be found in publications by Uchida et al. (Journal of Polymer Science: Part A: Polymer Chemistry, Vol. 27, 1989, p. 527), Yamada et al. (Journal of Applied Polymer Science, Vol. 44, 1992, p. 993), and Tretinnikov & Ikada (Macromolecules, Vol. 30, 1997, p. 1086).

References related to the treatment of hydrophobic polymers to render their surfaces more hydrophilic are also found in the patent literature. For example, U.S. Pat. No. 4,728,694 discloses the graft polymerization of acrylamide onto polyethylene surfaces by first oxidizing the surface to form carbonyl substituents, reducing these substituents to form hydroxyl groups, and finally using a free radical initiator to initiate graft polymerization. In another representative example, U.S. Pat. No. 3,526,583 discloses a method for increasing surface hydrophilicity which involves the treatment of a hydrophobic polymer with a gas that has been excited by radio frequency radiation. Finally, U.S. Pat. No. 3,317,330 discloses a method for producing hydrophilic surfaces on polyethylene and polypropylene by treating the surfaces with an oxidizing solution that contains sulfuric acid, chromium trioxide and potassium permanganate.

It is apparent that in all of the references cited above, surface modification is carried out by treating hydrophobic polymers with chemical reagents that are either toxic, corrosive or expensive; and that the processing techniques employed are often complicated and costly. All of the above surface modification techniques are therefore unrelated to this invention, which provides a method for coating hydrophobic surfaces by a simple procedure that uses inexpensive and non-toxic starch.

SUMMARY OF THE INVENTION

This invention is based on the unexpected discovery that starch coatings having a thickness of approximately one micrometer or less are spontaneously formed on the surfaces of hydrophobic polymers (e.g., polyethylene films), when the hydrophobic polymers are placed in contact with hot, aqueous solutions of starch, preferably prepared by steam jet cooking at elevated temperatures and pressures. These starch coatings are characterized by a number of important properties: (1) they do not separate from the hydrophobic plastic surface, even after prolonged standing in water; (2) they cause the surface of the hydrophobic polymer to be uniformly wet with water, as evidenced by contact angle measurements and by the absence of water droplets or beads of water on the polymer surface; (3) when dried, thin starch coatings remain firmly attached to the hydrophobic polymer surface, and these coatings separate only when the plastic article or film is vigorously wiped or rubbed; and (4) the dried, starch-coated plastic surface re-wets instantly when it is placed in contact with water. In an alternate embodiment of the invention, the adherence of the starch coating to the polymer surface is enhanced by reacting the starch coating with a suitable synthetic momomer to form a starch graft copolymer.

The hydrophilic surface properties of starch-coated plastics prepared according to this invention make them suitable for a number of specialized applications, such as those that require improved biocompatibility, improved compatibility with hydrophilic reagents, reduced build-up of electrostatic charge, reduced blocking, reduced friction, improved absorption of water-based dyes, and improved adhesion properties. Also, these starch coatings are non-toxic, inexpensive and biodegradable; and they form spontaneously on plastic surfaces from aqueous solutions of starch that are easily and inexpensively prepared by a continuous steam jet cooking process. Despite the fact that the hydrophobic plastic surface and the hydrophilic starch coating are mutually incompatible, thin starch coatings remain firmly attached after the coated film has been soaked in water and dried.

In accordance with this discovery, it is an object of this invention to provide a novel class of starch-coated plastic articles, in which starch is present in amounts sufficient to impart hydrophilic properties to the hydrophobic plastic surface. Normally, the percentage of starch, by weight, in the coated plastic article is approximately 1% or less. Heavier starch coatings (i.e., those having higher starch percentages) may be applied; however, these heavier starch coatings tend to separate more easily from the plastic surface.

It is also an object of the invention to provide a process for the effective and facile preparation of the starch-coated plastic compositions of the invention.

Other objects and advantages of the invention will become apparent from the following discussion.

DETAILED DESCRIPTION OF THE INVENTION

The starch coatings of this invention are preferably prepared from unmodified starches obtained from cereal grains, such as corn, wheat, sorghum and rice, or from root and tuber crops, such as cassava, potato and tapioca. Although a variety of different starches may be used, it will be recognized by those skilled in the art that differences in amylose content, branching, molecular weight and content of native lipid between the various starch varieties will result in different chemical and physical properties, and will thus exert an influence upon the thickness and properties of these starch coatings. As previously indicated, starches are available commercially that have widely varying proportions of amylose and amylopectin. Although any of these cornstarch varieties may be used to prepare the starch-coated plastics of this invention, the starch coatings tend to be thicker and to form more rapidly as the percentage of amylose in the starch increases. Although the coatings of this invention preferably consist essentially of starch, cereal flour (i.e., the finely milled meal consisting essentially of the starch and protein components of the endosperm) can also be used.

An unmodified starch is one that has not been altered by chemical treatment or reduced in molecular weight by reaction with acids or enzymes. Although modified starches are more expensive than unmodified starches, they may be used to impart certain properties to the coated plastic article that are not easily obtained with unmodified starch. For example, a cationic or anionic starch may be used to impart cationic or anionic properties to the plastic surface.

Some non-limiting examples of hydrophobic plastics that may be used as substrates for these starch coatings are polyethylene, polypropylene, polystyrene and the polymer classes generally known as polyesters and polyamides. These plastic materials will often be two-dimensional (planar) articles, such as thin films or sheets; however, three-dimensional (non-planar) plastic objects such as those typically formed by molding or extruding plastic may also be used. Polyethylene film is the most common substrate used.

The first step in the preparative process is to jet cook an aqueous slurry of starch at a near-neutral pH (i.e., pH 5–7), preferably using an excess steam jet cooker (see Klem & Brogly, supra). The experimental conditions chosen are those needed to attain complete disruption of starch granules and complete solution in water of both the amylose and amylopectin components of starch. The effects of steam jet cooking on the structure and properties of starch are discussed in two articles by Dintzis et al. (Journal of Rheology, Vol. 39, 1995, p. 1483; and Journal of Applied Polymer Science, Vol. 62, 1996, p. 749). We believe that the ability of starch to separate from a hot aqueous solution and to firmly attach itself to the surface of a hydrophobic polymer is related to the fact that both amylose and amylopectin are rendered totally water soluble by the high temperature and the intense mixing that occurs during the steam jet cooking process. Although the conditions used for steam jet cooking may be varied by one skilled in the art, temperature and steam pressure within the hydroheater are typically about 130°–150° C. and 20–50 psig, respectively; pumping rate is typically about 0.75–2.0 liters per minute; and steam line pressure entering the cooker is typically about 65–120 psig. The concentration of starch in water is preferably in the range of about 0.5–5%, by weight; and this concentration will depend upon the amylose content of the starch used. Low starch concentrations would be used with high amylose starches, because these materials form firm gels when jet cooked solutions are cooled. In contrast, waxy starch may be used at higher concentrations; since this starch does not readily form gels; and water solutions of waxy starch remain fluid and pourable even at relatively high concentrations. Gelling of starch solutions must be avoided during the preparative process, and cooled starch solutions must remain in a fluid and non-gelled state, even after they have reached room temperature or below. A concentration of about 1% is preferred when normal food grade cornstarch is used; since concentrations of about 4% tend to produce heavy, uneven coatings that sometimes separate from the plastic surface.

The second step in the preparative process is to submerge the plastic article in the hot, jet cooked starch solution and then allow the mixture to cool to near room temperature. One technique is to collect the hot, jet cooked starch solution (as it emerges from the cooker) in an insulated container (e.g., a Dewar flask); however, more rapid cooling may be accomplished by placing the hot starch solution in a non-insulated container (e.g., a glass or stainless steel beaker) before submerging the plastic article. The thickness and uniformity of the starch coating is affected by the rate of cooling of the hot starch solution. In most instances, heavier starch coatings are obtained when starch solutions are slowly cooled; however, these coatings are often non-uniform and sometimes separate from the surface of the plastic. Slow stirring during cooling tends to enhance the uniformity of the coating. When the starch solution containing the submerged plastic has cooled to approximately room temperature, the plastic is removed and preferably soaked for several hours in water to remove loosely-bound starch. The starch-coated plastic may then be optionally dried.

In a commercial operation, it would be desirable to employ a continuous or countercurrent feed of the plastic articles through the starch solution as known in the art. It is also envisioned that certain alternative coating methods, such as spraying of the starch solution onto the plastic surface, could also be employed; provided that the amount of starch solution and the temperature are sufficiently controlled during the period of contact with the plastic to permit adherent coating of the starch onto the plastic.

The starch-coated plastics of this invention are characterized by the appearance of a water-wet surface. Few, if any, discrete water droplets appear on the wet plastic surface; and the surface remains substantially wet (i.e., water will not form beads and run off), even when the plastic article is held in a vertical position. A water-wet surface is also indicated by contact angle measurements. That is, water droplets on starch-coated plastics of the invention are characterized by a relatively small contact angle as compared to water droplets on uncoated surfaces. After drying, starch-coated plastic surfaces exhibit a frosty appearance due to deposition of starch. The presence of starch can also be identified by its infrared spectrum and also by the characteristic blue color that results from treatment of coated films with a dilute aqueous solution of iodine/potassium iodide. When starch coatings become excessively heavy, they tend to be non-uniform (i.e., some areas of the plastic surface are more heavily coated than others). A disadvantage of heavy starch coatings is their tendency to flake off the plastic surface, when the starch-coated article is bent or flexed. Conversely, thin starch coatings remain firmly attached after drying and are separated from the plastic surface only by vigorous rubbing. Scanning electron microscopy shows that starch is deposited onto the plastic surface as nodules with diameters of approximately 1 micrometer or less. Under a dissecting light microscope, the starch appears as a distinct thin layer covering the plastic surface. In general, the level of application should be at least about 0.01 mg starch/cm$^2$ of plastic, and less than about 1 mg starch/cm$^2$ of plastic.

Preferably, the level of application will be at least about 0.02 mg starch/cm$^2$ of plastic, and less than about 0.1 mg starch/cm$^2$ of plastic in order to yield highly adherent coatings.

In an alternate embodiment of the invention, the adherence of the starch coating to the plastic surface is enhanced by graft polymerizing the starch. A suitable synthetic monomer for this purpose is acrylonitrile. The starch-coated plastic film described above, or perhaps just the starch coating itself, is contacted with a solution of acrylonitrile and a suitable initiator such as ceric ammonium nitrate as described by Weaver et al. (U.S. Pat. No. 3,997,484, herein incorporated by reference). The concentration of the acrylonitrile solution should be at least about 2.5 g/100 mL of water, and preferably at least about 3.5 g/100 mL water. The reaction will take place at room temperature, and will typically be conducted at a temperature of at least about 20° C. Under these conditions with the ceric ammonium nitrate, a reaction time of at least about 15 minutes, and preferably at least about 20 minutes, should be allowed. At the lower concentration levels of acrylonitrile, the reaction time will be longer than at the higher monomer levels. The level of synthetic polymer in the grafted coatings will depend on the desired balance of coating adherence versus hydrophilicity of the coated film. Generally, at the higher levels of grafting the coating is more adherent, but somewhat less hydrophilic than coatings having a lower level of grafting. Typically, the levels of synthetic polymer will be at least 1%, preferably at least 5%, by weight of the grafted starch coating. Levels as high as 15%, 20%, 25%, and even 30% can be attained and still improve the hydrophilic properties of the plastic film. As disclosed by Weaver et al., it is contemplated that methacrylonitrile would be equivalent to acrylonitrile for purposes of this embodiment.

It would appear from treatment of the graft polymerized starch coatings with alkali (that removes the grafted coating completely) that there is no carbon-carbon bonding between the starch graft polymer and the plastic film material.

Dimensional changes associated with the evaporation of water from polyacrylonitrile (PAN)-grafted coatings cause the films to reversibly curl during drying. Since the final shape of these coated films depends upon the presence or absence of water in the surrounding environment, these films may be considered to be a type of stimulus-responsive polymer. A relationship seems to exist between the extent to which these films curl and a number of factors, including the acrylonitrile concentration during grafting, conditions used for graft polymerization and the size and dimensions of the grafted film sample.

The following examples further illustrate the invention but do not limit the invention, which is defined by the claims. All references disclosed herein are incorporated by reference.

EXAMPLE 1

This example describes one embodiment of the invention, wherein normal, food grade cornstarch (having an amylose content of about 25% by weight) is jet cooked to give a starch solution containing about 4% solids; and the hot starch solution is then contacted with polyethylene film without stirring. Two different rates of cooling are compared.

A dispersion of 228 grams of normal food grade cornstarch (containing about 12% moisture) in 4 L of deionized water was steam jet cooked under the following conditions: 40 psig in the hydroheater, 70 psig line pressure, and a pumping rate of about 1 L/minute. The hot, jet cooked solution (containing 4.2% starch solids) was collected in an insulated Dewar flask. A second jet cooked starch solution was prepared under identical conditions, and 3 L of this hot solution was placed in a non-insulated beaker. To each of these hot starch solutions was added two 3"×6" commercial low-density polyethylene bags, which had been cleaned with a warm (50° C.) solution of laboratory detergent (45 g of Alconox® in 4 L of water). Weights were placed in the bags so that they would remain completely submerged. The bags were allowed to stand in the unstirred starch solutions for 19.5 hours. At the end of this time period, the temperature of the starch solution in the Dewar flask was 58° C. In contrast, the solution in the beaker had cooled to 29° C. after 5.5 hours. The bags were removed from the starch solutions, and loosely bound starch was removed from the polyethylene surfaces by soaking the bags in water (three changes of deionized water and a total soaking time of about 4 hours at room temperature).

An uneven starch coating was observed when cooling was carried out slowly in the Dewar flask, and the polyethylene surface exhibited both light and heavy coverage. The starch coating in the lightly coated areas amounted to about 1% of the film sample weight (coating on one surface only). This is equivalent to about 0.094 mg starch/$cm^2$. Heavily coated areas contained about 4–8% starch (equivalent to about 0.39–0.81 mg starch/$cm^2$). Rapid cooling in the beaker produced a more even coating (as shown by scanning electron microscopy) on the polyethylene surface, and this starch coating amounted to about 1%, by weight, of the polyethylene sample. Although starch in heavily-coated areas tended to flake off the surface, after the film was dried, starch in the lightly-coated areas remained firmly attached after drying, and vigorous rubbing was required to separate it from the polyethylene surface.

EXAMPLE 2

Experimental conditions were similar to Example 1, except that the jet cooked starch solutions were slowly stirred as they were allowed to cool. Rapid cooling (beaker) produced a starch coating that amounted to about 1%, by weight, of the polyethylene sample. Slow cooling (Dewar flask) produced a coating that amounted to about 0.65% of the sample weight. This is equivalent to about 0.061 mg starch/$cm^2$. As shown by scanning electron microscopy, the plastic is evenly coated with the starch.

EXAMPLE 3

Experimental conditions were similar to Example 1, except that waxy cornstarch (containing 0% amylose) was used instead of normal food grade cornstarch. As in Example 1, starch solutions were not stirred. Rapid cooling (beaker) produced a starch coating that amounted to about 0.1–0.2%, by weight, of the polyethylene sample. This is equivalent to about 0.0093–0.019 mg starch/$cm^2$. Slow cooling in the Dewar flask produced a coating that amounted to about 0.5% of the sample weight (equivalent to about 0.047 mg starch/$cm^2$).

EXAMPLE 4

Experimental conditions were similar to Example 1, except that high amylose cornstarch containing about 70% amylose by weight was used instead of normal food grade cornstarch; and the starch concentration in the hot, jet cooked solution was adjusted to about 1%, so that gel formation would not occur on cooling. As in Example 1, starch solutions were not stirred. Rapid cooling (beaker) produced a starch coating that amounted to about 0.6% of the polyethylene sample weight. This is equivalent to about 0.056 mg starch/$cm^2$. Slow cooling in the Dewar flask produced an uneven coating of starch that amounted to about 1.5–5% of the polyethylene sample weight.

EXAMPLE 5

Experimental conditions were similar to Example 1, except that the concentration of normal food grade cornstarch in the hot, jet cooked solution was adjusted to about 1%. As in Example 1, starch solutions were not stirred. Rapid cooling (beaker) produced a starch coating that amounted to about 0.8% of the polyethylene sample weight. This is equivalent to about 0.075 mg of starch/$cm^2$. Slow cooling in the Dewar flask produced an uneven coating of starch that amounted to about 0.8–1.9% of the polyethylene sample weight (equivalent to about 0.075–0.18 mg of starch/$cm^2$).

EXAMPLE 6

A dispersion of 50.0 g of normal food grade cornstarch in 4 L of water was jet cooked as in Example 1, and the hot, jet cooked solution was collected in an insulated Dewar flask. This solution (containing 1.13% starch solids) was poured into a 3-L beaker (to about 1 cm above the 2500 mL mark), and two 3"×6" polyethylene bags (washed as in Example 1) were suspended in the hot solution. The solution (about 80° C.) was then stirred with a magnetic stirring bar for 24 hours at about 100 rpm, while it was allowed to cool to room temperature. The bags were removed from the starch solution, washed with deionized water as in Example 1, and allowed to air-dry at room temperature. A 20 $cm^2$ portion was cut from the starch-coated bag and analyzed for starch using the phenol/sulfuric acid method described by W. R. Morrison and B. Laignelet in Journal of Cereal Science, Vol. 1, 1983, pp. 9–20. In two experiments carried out under outwardly identical conditions, starch deposited on the polyethylene surface amounted to 0.022 and 0.043 mg/$cm^2$. This variability in starch coverage did not affect the hydrophilic surface properties of the starch-coated polyethylene sample.

EXAMPLE 7

Example 6 was repeated using potato starch instead of normal food grade cornstarch. The jet cooked potato starch solution contained 1.08% starch solids, and the initial and final temperatures were 79.4° C. and 20.0° C., respectively. The amount of starch deposited on the polyethylene surface was 0.053 mg/$cm^2$ (determined as in Example 6).

EXAMPLE 8

Example 6 was repeated using wheat starch instead of normal food grade cornstarch. The jet cooked wheat starch solution contained 1.14% starch solids, and the initial and final temperatures were 79.1° C. and 21.2° C., respectively. The amount of starch deposited on the polyethylene surface was 0.056 mg/$cm^2$ of polyethylene (determined as in Example 6).

EXAMPLE 9

Example 6 was repeated using unbleached wheat flour instead of normal food grade cornstarch. The jet cooked wheat flour solution contained 1.15% solids, and the initial and final temperatures were 75.3° C. and 22.1° C., respectively. The amount of starch deposited on the polyethylene surface was 0.083 mg/cm$^2$ of polyethylene (determined as in Example 6).

EXAMPLE 10

Normal food grade cornstarch was jet cooked and collected as in Example 6. This solution (containing 1.13% and 1.15% starch solids in two repeat experiments) was poured into a 4-L beaker to about 1 cm above the 3500 mL mark), and two 6"×6" polyethylene bags (washed as in Example 1) were suspended in the hot solution. The solution was stirred and allowed to cool as in Example 6. The initial temperature was 80.1° C., and the final temperature was 17.9° C. The bags were removed from the starch solution, washed with deionized water as in Example 1, and allowed to air dry at room temperature. Starch was removed from the surfaces of four 12×12 cm squares of starch-coated polyethylene, and this surface starch (in water dispersion) was freeze-dried and weighed. Surface coverage of starch was 0.0467 mg/cm$^2$ using this gravimetric method and was 0.0594 mg/cm$^2$ using the phenol/sulfuric acid method of Example 6. In a repeat experiment carried out under similar conditions, the initial temperature was 77.4° C.; and the final temperature was 23.6° C. In this experiment, the two analytical methods gave values of 0.0470 and 0.0575 mg starch/cm$^2$, respectively.

The surface wetting of starch-coated polyethylene prepared in above experiments was verified by measuring the contact angles of water drops placed on the polyethylene surface. The instrument used for these measurements was a Tantec Contact Angle Meter, Model CAM-MICRO, manufactured by Tantec, Shaumberg, Ill. A contact angle of 44° was observed for the starch-coated polyethylene samples; whereas a contact angle of 72° was observed for uncoated polyethylene. The lower contact angle for the starch-coated samples indicates improved surface wetting (expanded surface contact by individual water droplets) due to the starch coating.

EXAMPLE 11

This experiment shows that surface coverage of plastics such as polyethylene can be achieved in time periods of 4 hours or less, if starch is jet cooked to yield solutions containing 4–5% starch by weight.

A dispersion of 225.3 g of normal, food grade cornstarch (containing 11.2% moisture) was jet cooked and collected as in Example 1. The hot jet cooked solution (containing 4.44% starch solids) was poured into a 4-L beaker, and two 6"×6" polyethylene bags were added as in Example 10. The mixture was stirred for 4 hours as in Example 6 (initial temperature: 80.3° C.; final temperature: 58.9° C.), and the bags were removed, washed with water and air dried. Analysis of surface starch using the phenol/sulfuric acid method described in Example 6 gave a value of 0.0825 mg of starch/cm$^2$.

A similar experiment in which polyethylene bags were stirred for only 1 hour with jet cooked starch solution produced a hydrophilic surface that appeared uniformly wet with water; however, starch on the surface of the air-dried film was barely visible.

EXAMPLE 12

Example 10 was repeated using waxy cornstarch (containing 0% amylose) instead of normal food grade cornstarch. The jet cooked waxy cornstarch solution contained 1.16% solids, and the initial and final temperatures were 79.8° C. and 23.8° C., respectively. The amount of starch deposited on the polyethylene surface was 0.034 mg/cm$^2$ of polyethylene, using the phenol/sulfuric acid method described in Example 6.

EXAMPLE 13

Example 10 was repeated using high amylose cornstarch (amylose content about 70%) instead of normal food grade cornstarch. The jet cooked high amylose cornstarch solution contained 1.14% solids, and the initial and final temperatures were 80.9° C. and 23.7° C., respectively. The amount of starch deposited on the polyethylene surface was 0.050 mg/cm$^2$ of polyethylene, using the phenol/sulfuric acid method described in Example 6.

EXAMPLE 14

Preparation of Starch-Coated Polythylene Film

A dispersion of 56.32 grams of normal food grade cornstarch (containing 11.22% moisture) in 4 L of deionized water was steam jet cooked under the following conditions: 40 psig back pressure, 70 psig line pressure, and a pumping rate of about 1-/minute. The jet cooked starch solution (containing 1.16% solids) was collected in an insulated Dewar flask. This solution was poured into a 4-L beaker to about 1 cm above the 3500 mL mark. Two 6×6 inch commercial, low-density polyethylene, "Zip-Lock" bags were cleaned with a warm (120° F.) solution of laboratory detergent (45 g of Alconox in 4 L of water), rinsed thoroughly with deionized water and placed in the hot starch solution. Weights were placed in the bags so that they would remain completely submerged. The solution was slowly stirred with a magnetic stir-bar and allowed to cool to room temperature over a period of 24 hours. Initial and final temperatures were 77.6° C. and 23.4° C., respectively. The PE bags were removed from the starch solution, washed with water at room temperature, and allowed to air dry. A 10 square centimeter portion was cut from the starch-coated bag and analyzed for starch using the phenol/sulfuric acid method described by W. Dubois et al. (*Analytical Chemistry*, Vol. 28, 1956, pp. 350–356). The amount of surface-deposited starch was 0.053 mg per square centimeter of polyethylene (single side coverage).

EXAMPLE 15

Preparation of Starch-graft-polyacrylonitrile (Starch-g-PAN) Standards for Infrared Analysis (FTIR)

A stirred mixture of 10.0 g of jet cooked and drum dried cornstarch in 200 mL of water was purged for 1 hour with a slow stream of nitrogen. Acrylonitrile (either 10.0, 8.0, 6.0 or 4.0 g) was added, and the mixture was stirred for 5 minutes at 25° C. A solution of 0.336 g of ceric ammonium nitrate in 3 mL of 1N nitric acid was added, and the mixture was allowed to react for 1.5 hours at 25° C. The swollen precipitate of starch-g-PAN was isolated by centrifugation, neutralized with dilute NaOH solution to pH 6.0–6.5 and washed thoroughly with water. The precipitated graft copolymer was finally diluted with water to about 300 mL and stirred for 1 minute in a Waring blender at high speed. These undried dispersions were used as standards for analyses of film surfaces by attenuated total reflectance infrared spectroscopy (ATR). Graft copolymers isolated from these dispersions by freeze-drying were used as standards for KBr transmission infrared spectroscopy.

To determine weight percent PAN in these polymers, 5.00 g (dry basis) of freeze-dried graft copolymer was heated for 3 hours under reflux in 500 mL of 0.5N HCl. The insoluble PAN remaining after hydrolysis of starch was isolated by filtration, washed with water and ethanol and dried at 60° C. under vacuum. Weight percent PAN for the four levels of acrylonitrile addition indicated above, calculated from weight loss after acid hydrolysis, was 47.6, 40.4, 33.1 and 24.1%, respectively.

EXAMPLE 16

Infrared Analysis (FTIR) of Grafted Starch Coatings

FTIR spectra were obtained on a Nicolet Impact 410 spectrometer using Omnic software from Nicolet. Starch-g-PAN standards were applied to the surface of an ATR crystal as aqueous dispersions; and the dispersions were allowed to dry under ambient conditions. Absorbances of the PAN peak at 2243 cm$^{-1}$ and the starch peak at 1026 cm$^{-1}$ were then determined, and percent PAN in each graft copolymer standard was plotted against the 2243/1026 absorbance ratio. Four replicate determinations were made on each graft copolymer standard. A formula derived from this plot by regression analysis was then used to determine weight percent PAN in unknown graft copolymer coatings. PAN-grafted, starch-coated PE films were pressed onto the ATR crystal using the same pressure for each film sample.

Freeze-dried graft copolymers with known PAN contents were used as standards for KBr transmission spectroscopy. The particle size of these freeze dried polymers was sufficiently small that further grinding of the samples had no effect upon the absorbance per milligram of sample. Four replicates analyses were carried out for each polymer standard, and regression analysis of a plot of % PAN vs. the 2243/1026 absorbance ratio was used to analyze unknown samples.

Absorbance in FTIR spectra at 2243 cm$^{-1}$ and 1026 cm$^{-1}$ was used to estimate milligrams of PAN and starch in KBr pellets prepared from freeze-dried samples. Pellets used to obtain standard curves of absorbance vs. weight of PAN and starch in the pellet were prepared from the four graft copolymer standards using sample sizes ranging from 0.050 mg to 1.0 mg. The ratio of absorbance to weight was constant throughout the entire range.

EXAMPLE 17

Graft Polymerization of Acrylonitrile onto Starch-Coated PE Film (2×5 cm strip) Acrylonitrile Concentration: 5.0 g/100 mL of Water Reaction time: 20 minutes Water (100 mL, in a 125 mL Erlenmeyer flask) was purged for 1 hour with a slow stream of nitrogen at 25° C. Five grams of acrylonitrile was then added, and the mixture was stirred for 30 minutes to dissolve the monomer. A 2×5 cm strip of starch-coated PE film was placed in the solution, and the mixture was allowed to stand for 5 minutes to thoroughly wet the starch coating. A solution of 0.33 g of ceric ammonium nitrate in 3 mL of 1 N nitric acid was then added, and the solution was gently stirred for 20 minutes. At the end of this time, the yellow solution remained clear and showed no opalescence. The PE strip was removed, washed with water and allowed to air-dry. The PAN-grafted starch coating contained 25±2% PAN, by weight (average of five replicate experiments standard deviation).

Grafting of PAN caused the PE strip to curl on drying, due to dimensional changes associated with drying the PAN-grafted starch coating that strongly adhered to the PE film surface. The film strip curled in helical fashion producing approximately a one half helical loop along its length. Although the curl was lost when the film was placed back into water, curling was again observed when the film was dried.

To determine the amount of starch-g-PAN removable by water treatment, a 1×5 cm grafted strip was covered with 1 mL of water in a glass Petri dish. The dish was covered and placed in an oven at 100° C. for 5 minutes. The wet surface of the strip was then vigorously rubbed with the forefinger covered with a latex glove. The water extract was removed, the wet surface was similarly rubbed two more times with fresh water at room temperature, and the strip was allowed to air-dry. The fraction removable with water was isolated from the combined water extracts by freeze drying. This fraction contained 19±5% PAN and amounted to only 15±5% of the original PAN-grafted starch coating. The small amount of starch-g-PAN removable by this procedure was unexpected; since starch coatings that were not grafted with PAN could be easily removed from water-wet surfaces using this technique. The PAN-grafted starch coating remaining on the PE surface contained 34±4% PAN.

Ungrafted PAN was extracted from the grafted starch coating by placing a 1×5 cm grafted strip in about 30 mL of DMF, and allowing the mixture to stand overnight. The strip was transferred to fresh DMF; and after about 1 hour, the strip was removed, washed with water and allowed to air dry. The grafted starch coating, after DMF extraction, contained 23±1% PAN (average of four experiments standard deviation). The fraction removed by rubbing the surface with water amounted to 31±3% of the original starch-g-PAN coating and contained 20±6% PAN. The PAN-grafted starch coating remaining on the PE surface after treatment with water contained 33±1% PAN.

EXAMPLE 18

Graft Polymerization of Acrylonitrile onto Starch-Coated PE Film (2×5 cm strip) Acrylonitrile Concentration: 3.75 g/100 mL of Water Reaction Time: 20 minutes The procedure was similar to that used in Example 17, except that 3.75 g of acrylonitrile was used instead of 5 g. The PAN-grafted starch coating contained 6% PAN, by weight. The grafted starch coating was not extracted with DMF, and no attempt was made to remove the coating by rubbing the surface with water.

EXAMPLE 19

Graft Polymerization of Acrylonitrile onto
Starch-Coated PE Film (2×5 cm strip) Acrylonitrile
Concentration: 2.5 g/100 mL of Water Reaction
Time: 20 minutes The procedure was similar to that used in Example 17, except that 2.5 g of acrylonitrile was used instead of 5 g. No graft polymerization of PAN onto the starch coating was detected by FTIR.

EXAMPLE 20

Graft Polymerization of Acrylonitrile onto
Starch-Coated PE Film (2×5 cm strip) Acrylonitrile
Concentration: 2.5 g/100 mL of Water Reaction
Time: 55 minutes The procedure was similar to that used in Example 19, except that the polymerization was allowed to proceed for 55 minutes. The polymerization was stopped when the reaction mixture appeared opalescent due to precipitation of PAN from water solution. The dried film after graft polymerization was less curled than the grafted film obtained in Example 17.

The PAN-grafted starch coating contained 23% PAN, by weight. Starch-g-PAN removed by water treatment as in Example 17 contained 7% PAN and amounted to 19% of the original PAN-grafted starch coating. The PAN-grafted starch coating remaining on the PE surface contained 29% PAN.

DMF was used to extract ungrafted PAN from the grafted starch coating as in Example 17. The grafted starch coating, after DMF extraction, contained 24% PAN. The fraction removed by water treatment contained 9% PAN and amounted to 20% of the original starch-g-PAN coating. The PAN-grafted starch coating remaining on the PE surface after water treatment 28% PAN.

EXAMPLE 21

Graft Polymerization of Acrylonitrile onto
Starch-Coated PE Film (1×5 cm strip) Acrylonitrile
Concentration: 5 g/100 mL of Water Reaction
Time: 30 minutes The procedure was similar to that used in Example 17, except that a 1×5 cm strip of starch-coated PE film was used for graft polymerization, and the polymerization was allowed to proceed for 30 minutes. The polymerization was stopped when the reaction mixture appeared opalescent due to precipitation of PAN from water solution. The PAN-grafted starch coating contained 21% PAN. The air-dried film was more tightly curled than the film of Example 17, forming two complete helical loops.

EXAMPLE 22

Treatment of Ungrafted, Starch-Coated PE Film
with Boiling Water

A 1×2.5 cm strip of the ungrafted, starch-coated PE film described in Example 14 was heated for 5 minutes in 50 mL of boiling water. The strip was then rinsed with water and allowed to air-dry. FTIR analysis of the film surface showed that the starch coating was completely removed by this procedure.

EXAMPLE 23

Treatment of PAN-Grafted, Starch-Coated PE Film
with Boiling Water

A 1×2.5 cm strip of a PAN-grafted, starch-coated PE film prepared according to Example 17 (PAN content of the coating: 23%, by weight) was heated for 3 hours in 50 mL of boiling water. The strip was washed with water and allowed to air-dry. FTIR analysis showed that starch-g-PAN still remained on the PE film surface. The PAN content of this remaining coating was about 58%, indicating that some of the starch had been selectively removed by treatment with boiling water.

EXAMPLE 24

Treatment of PAN-Grafted, Starch-Coated PE Film
with Boiling 0.5 N HCl

A 1×2.5 cm strip of the same PAN-grafted, starch-coated PE film used in Example 23 was heated for 3 hours in 50 mL of boiling 0.5 N HCl. The strip was washed with water and allowed to air-dry. FTIR analysis showed that starch had been removed from the coating by acid hydrolysis; however, PAN still remained on the PE film surface.

EXAMPLE 25

Treatment of PAN-Grafted, Starch-Coated PE Film
with Boiling 0.7 N NaOH (16950-32)

A 1×2.5 cm strip of the same PAN-grafted, starch-coated PE film used in Example 23 was heated for 1 hour in 50 mL of boiling 0.7 N NaOH. The strip was washed with water and allowed to air-dry. FTIR analysis showed that the starch-g-PAN coating had been completely removed by the above treatment.

We claim:

1. An article of manufacture comprising a hydrophobic polymeric substrate having an adherent, firmly attached hydrophilic coating of a graft copolymer of solubilized starch, wherein said hydrophobic polymeric substrate is a material selected from the group consisting of polyethylene, polypropylene, polystyrene, polyester, and polyamide.

2. The article of claim 1, wherein said graft copolymer is starch polyacylonitrile.

3. The article of claim 1, wherein said solubilized starch is totally solubilized.

4. The article of claim 1, wherein said solubilized starch is jet cooked starch.

5. The article of claim 1, wherein said solubilized starch consists essentially of starch or cereal flour.

6. An article of manufacture comprising a hydrophobic polymeric substrate having an adherent, firmly attached hydrophilic coating of a graft copolymer of solubilized starch, wherein said hydrophilic coating consists of nodules.

7. An article of manufacture comprising a hydrophobic polymeric substrate having an adherent, firmly attached hydrophilic coating of a graft copolymer of solubilized starch, wherein said coating has a thickness of approximately 1 micrometer or less.

8. The article of claim 1, wherein said hydrophobic polymeric substrate is a film or sheet.

9. The article of claim 1, wherein said hydrophobic substrate is a three-dimensional object.

10. The article of claim 7, wherein said hydrophobic polymeric substrate is a material selected from the group consisting of polyethylene, polypropylene, polystyrene, polyester, and polyamide.

11. The article of claim 1, wherein said hydrophobic polymeric substrate is a material comprising polyethylene.

12. The article of claim 1, wherein said starch is selected from the group of corn starch, wheat starch, rice starch, sorghum starch, potato starch, cassava starch, tapioca starch and flours comprising said starches.

13. The article of claim 1, wherein said starch is selected from the group of waxy starch, high amylose starch, and a starch comprising about 25% amylose by weight.

14. The article of claim 1, wherein said hydrophilic coating on said polymeric substrate is present in an amount of at least about 0.01 mg starch/$cm^2$ of polymeric substrate.

15. The article of claim 1, wherein said hydrophilic coating on said polymeric substrate is present in an amount of at least about 0.02 mg starch/$cm^2$ of polymeric substrate.

16. The article of claim 1, wherein said hydrophilic coating on said polymeric substrate is present in an amount of less than about 1 mg starch/$cm^2$ of polymeric substrate.

17. The article of claim 1, wherein said hydrophilic coating on said polymeric substrate is present in an amount of less than about 0.08 mg starch/$cm^2$ of polymeric substrate.

18. The article of claim 6, wherein said hydrophobic polymeric substrate is a material selected from the group consisting of polyethylene, polypropylene, polystyrene, polyester, and polyamide.

* * * * *